May 7, 1968            I. D. JOHNSON            3,381,714

PIPELINE BLOCKING DEVICE AND PROCESS FOR ITS USE

Filed June 29, 1965            2 Sheets-Sheet 1

SECTION A-A'

INVENTOR
IRVIN D. JOHNSON
BY
ATTORNEY

United States Patent Office 3,381,714
Patented May 7, 1968

3,381,714
**PIPELINE BLOCKING DEVICE AND
PROCESS FOR ITS USE**
Irvin D. Johnson, Littleton, Colo., assignor to Marathon
Oil Company, Findlay, Ohio, a corporation of Ohio
Filed June 29, 1965, Ser. No. 467,896
10 Claims. (Cl. 138—97)

ABSTRACT OF THE DISCLOSURE

The present invention comprises devices and processes for controlling flow in pipeline by use of a pig transportable through a pipeline, stopping means located on the pig for holding the pig fixedly in place within the pipeline, flow control means on the pig for controlling the flow of liquid through the pipeline, and an actuation means mounted on the pig for actuating the stopping means and the flow control means in response to a signal transmitted from the exterior of said pipeline pig, wherein the actuating means is responsive to radiant signals generated outside said pipeline pig.

---

The present invention relates to new methods for the stopping of the flow of fluids in pipelines and in particular relates to new blocking devices for blocking either partially or completely the flow of fluids through pipelines.

The installation of valves in pipelines greatly increases the cost of total pipeline installation. As a result, valves are generally placed in lines only where they will be most needed and long portions of pipelines may be devoid of any sort of control device. Where it is necessary to stop the fluid at a particular point due to the need for inserting a large connection into the line, or particularly in emergencies as in pipeline leaks, a portable flow control device utilizable at any point in a pipelines is desirable.

The present invention supplies this device and, in addition, supplies means for the accurate positioning and remote actuation of the flow control mechanism.

Figure 1:
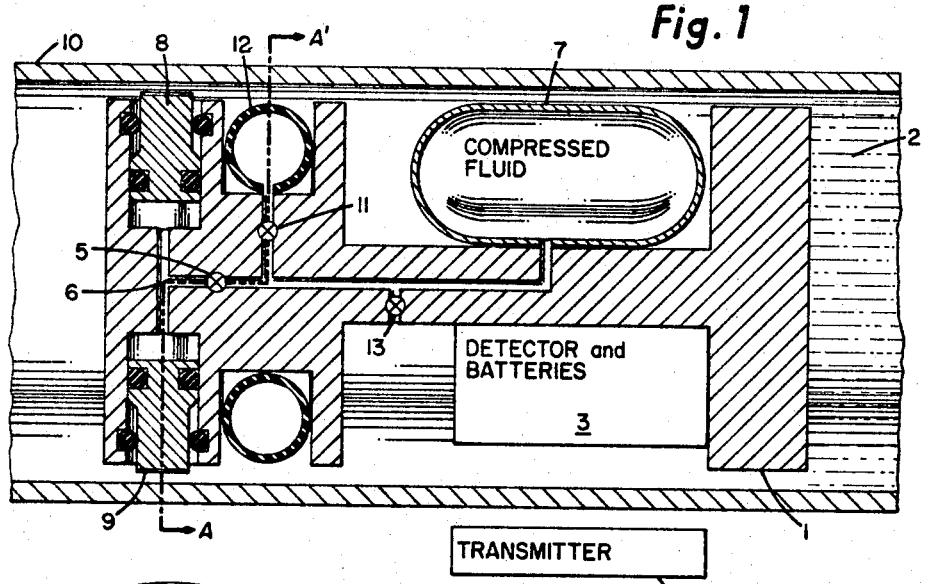
FIGURE 1 is a schematic diagram of a specific embodiment of the present invention and FIGURE 1a is a section view of the same embodiment.
Figure 1A:
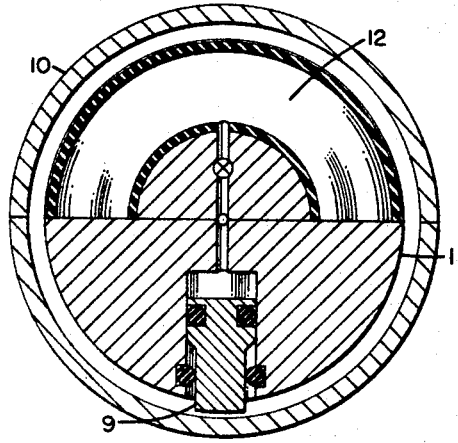

In FIGURE 1, the pig body 1 has sufficient cross sectional area transversed through the major axis of the pipeline to permit the pig to be moved through the pipeline by the action of the transported fluid 2. A detector 3 mounted on the pig body detects electromagnetic signals from a transmitter 4 located on the exterior of the pipeline near the point at which flow is to be controlled. Upon receiving a signal from the transmitter 4, the detector opens valve 5, thus pressurizing cylinders 6 with compressed air from tank 7 and forcing pistons 8 and 9 outward to press against the interior wall of the pipeline 10 and hold the pig in a fixed position. After a time sufficient to permit pumps to be stopped if necessary and to permit the pistons 8 and 9 to be positioned tightly against the interior wall of the pipeline 10, a second signal from the transmitter to the detector opens valve 11 admitting compressed air into an inflatable toric bladder. The bladder 12 inflates sufficiently to press tightly against the interior wall of the pipeline 10 and thus shuts off the flow of the fluid 2 through the pipe. The pig thus remains fixed in place, with the bladder 12 substantially completely sealing the pipeline against flow of fluid thus permitting repairs to the pipeline at a point downstream from the pig. Thereafter, a third signal from the transmitter activates vent valve 13 which releases the pressure from the bladder 12 and the cylinder chamber 6, permitting the pistons 8 and 9 to release their pressure against the interior wall of the pipeline 10. The pig then once again moves through the pipeline under the force of the fluid being transported 2 and is recovered at a convenient point downstream.

In a particularly perferred embodiment of the present invention, the device of FIGURE 1 is actuated by a transmitter having a highly localized antenna so as to generate a signal detectable only in the immediate area of the transmitter antenna. The antenna is placed close to the pipe at the point where flow is to be controlled and the transmitter is turned on. A detector 3 of the pig responds to the transmitted signal only when the pig is directly adjacent to the transmitter. Thus, the transmitter antenna is simply placed at the point where the pig is to be located and the pig automatically inflates when it is at that location.

A wide variety of other modifications and variations of the present invention will be apparent to those skilled in the art. For example, the bladder need not be toric but can be spherical, pancake shaped, or any other shape which conveniently seals against the walls of the pipeline. The pistons 8 and 9 may be omitted and the pressure of the baldder against the pipeline made sufficiently large to itself hold the pig in place. All of the components can be located inside the bladders to present a smooth exterior. The pipeline need not be circular and the pig may be utilized in trenches or ducts having square or even irregular cross sections. The compressed air may readily be replaced with other compressed gases, or fluids pressurized by the action of a spring loaded reservoir, and the energizing fluids need not act directly on the pistons, but may act through a pneumatic-mechanical or pneumatic-hydraulic or other conventional linkage. The body of the pig may be annular with a hole extending through the body to permit some flow of the fluid being transported. This hole may, in turn, be closed by means of a motor driven valve actuated by signals from the transmitter. Also, the bladder may be more or less fully inflated in order to close off all or only a portion of the cross section of the pipeline and to thus control the flow of the transmitter fluid.

Figure 3:
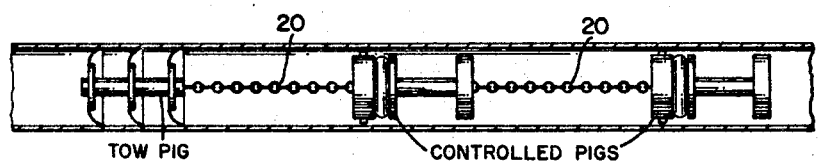
FIGURE 3 shows a string of controlled pigs being towed by a tow-pig.

As shown in FIGURE 3, the pigs may be towed in series, held together by chains which are automatically released when the metal pistons 8 and 9 are engaged. When a series of pigs such as that shown in FIGURE 3 is used, the pigs will generally be pulled through the pipeline to the point where the first control fluid is required at which point a transmitter will actuate the pig causing its pistons 8 and 9 to engage and to release the chain 20. The pig is then inflated as described above. After use, the pigs may be recovered by means of a push pig which pushes all of the deflated pigs to a convenient upstream recovery point.

Figure 2:
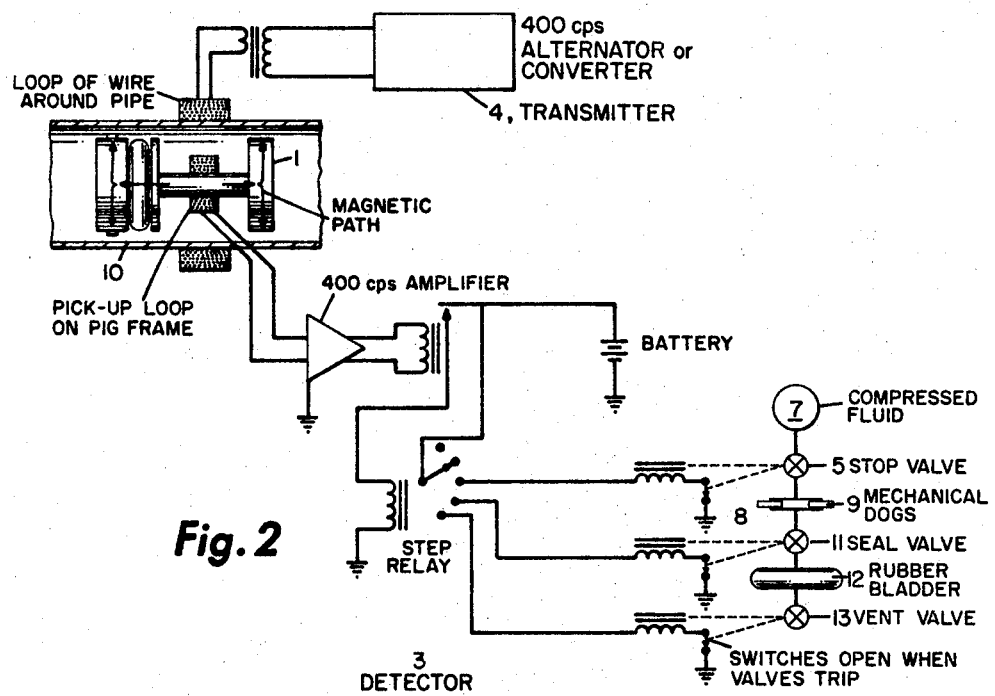
FIGURE 2 is a circuit diagram for the pig of FIGURE 1 and for a particularly preferred localized transmitter.

Other variations which may be employed include the use of explosives for fixing the pig in place within the pipeline, the use of various kinds of electromagnetic signal such as magnetic signals which are more localized in nature than conventional radio waves (such a magnetic transmitter is shown in FIGURE 2), non-electromagnetic radiation including atomic radiation, and acoustic signals; "radiant signals" as used herein, consist of such radio, magnetic, atomic, and acoustic signals.

Other variaitons and modifications will be apparent to those skilled in the art and the claims appended hereto are intended to include all novel features which fall within the spirit of the invention.

What is claimed is:

1. A device for controlling flow in pipelines comprising a pig transportable through a pipeline, stopping means located on said pig for holding said pig fixedly in place within said pipeline, flow control means on said pig for controlling the flow of liquid through said pipeline, an actuation means mounted on said pig for actuating said stopping means and said flow control means in response to a signal transmitted from the exterior of said pipeline pig, wherein said actuating means is responsive to radiant signals generated outside said pipeline pig.

2. A system for controlling flow at a number of points in a pipeline comprising a number of the devices of claim 1 attached in series and being pulled by a puller pig which is transported within the interior of the pipeline by the force of the liquid flowing within the pipeline, each of said devices of claim 1 having responsive to radiant signals for unhooking it from the remaining pigs in the series at a point at which flow is to be controlled.

3. A device for controlling flow in pipelines comprising a pig transportable through a pipeline, stopping means located on said pig for holding said pig fixedly in place within said pipeline, flow control means on said pig for controlling the flow of liquid through said pipeline, an actuation means mounted on said pig for actuating said stopping means and said flow control means in response to a radiant signal transmitted from the exterior of said pipeline pig, wherein said flow control means comprises at least one inflatable bladder, said bladder being in tight contact with the interior walls of said pipeline only when said bladder is inflated, and inflation means comprising a source of compressed fluid mounted on said pig and connected to said bladder, the flow of said compressed fluid into said bladder being controlled by said actuating means.

4. A process for controlling the flow of fluids in a pipeline comprising in combination the steps of inserting into said pipeline a pig transporting said pig within the interior of the pipeline to a location in which flow is to be controlled, stopping said pig by means of a radiant signal transmitted from the exterior of said pipeline pig and propagated through fluids contained within said pipeline, and/or through said pipeline, fixing the position of said pig within said pipeline, inflating a bladder on said pig by injecting fluid into said bladder under pressure, said bladder at least partially blocking the flow of fluid through said pipeline.

5. The process of claim 4 wherein said radiant signal is continuously transmitted and is sufficiently localized so that said signal is received by said pig only when said pig is in the locality of the transmitter of said signal.

6. The process of claim 4 wherein the stopping of said pig and the inflation of said bladder is commenced in response to a magnetic signal emanating from a source on the exterior of said pipeline.

7. The process of claim 4 wherein the bladder substantially entirely blocks the flow of fluid through the pipeline.

8. The process of claim 4 wherein the bladder is toric.

9. The process of claim 4 wherein the stopping of said pig and the inflation of said bladder is commenced in response to an atomic radiation signal emanating from a source on the exterior of said pipeline.

10. The process of claim 4 wherein the stopping of said pig and the inflation of said bladder is commenced in response to an acoustic signal emanating from a source on the exterior of said pipeline.

References Cited
UNITED STATES PATENTS

| | | | |
|---|---|---|---|
| 1,221,733 | 4/1917 | Henderson | 138—90 |
| 2,601,248 | 6/1952 | Brenholdt | 15—104.06 X |
| 2,701,960 | 2/1955 | Irwin | 73—40.5 |
| 2,894,539 | 7/1959 | Cook et al. | 138—97 |
| 3,106,735 | 10/1963 | Landrum et al. | 138—97 X |
| 3,153,845 | 10/1964 | Loomis | 73—40.5 X |

HENRY T. KLINKSIEK, *Primary Examiner.*

UNITED STATES PATENT OFFICE
CERTIFICATE OF CORRECTION

Patent No. 3,381,714                                May 7, 1968

Irvin D. Johnson

It is certified that error appears in the above identified patent and that said Letters Patent are hereby corrected as shown below:

Column 1, line 38, "pipelines" should read -- pipeline --; Column 2, line 27, "baldder" should read -- bladder --; line 68, "variaitons" should read -- variations --. Column 3, line 16, after "having" insert -- release means --.

Signed and sealed this 11th day of November 1969.

(SEAL)
Attest:

Edward M. Fletcher, Jr.                        WILLIAM E. SCHUYLER, JR.
Attesting Officer                                     Commissioner of Patents